Joseph M. Augl
William J. Bailey
Porter W. Erickson
INVENTORS

United States Patent Office 3,677,787
Patented July 18, 1972

3,677,787
METHOD OF REHARDENING ENCAPSULATING COMPOSITIONS
Joseph M. Augl, Sterling Park, Va., and William J. Bailey, University Park, and Porter W. Erickson, Silver Spring, Md., assignors to the United States of America as represented by the Secretary of the Navy
Filed Oct. 21, 1970, Ser. No. 82,671
Int. Cl. B23p 7/00; B32b 35/00
U.S. Cl. 117—2 R                    10 Claims

ABSTRACT OF THE DISCLOSURE

A method of hardening encapsulating (potting) compositions containing a linkage that is susceptible to hydrolytic cleavage i.e., polyamides, polyester and polyester base type polyurethanes, which are either in the virgin state or which have deteriorated due to exposure to a hot, moist environment by contacting with a chemical hardening agent selected from the group consisting of multifunctional isocyanates, multifunctional epoxides, multifunctional isothiocyanates, carbodiimides and mixtures thereof which may also contain a constituent selected from the group consisting of monoisocyanates, monoepoxides, monoisothiocyanates and mixture thereof.

BACKGROUND OF THE INVENTION

This invention relates generally to encapsulating compositions and more particularly to a method of hardening encapsulating compositions which have deteriorated due to exposure to a hot, moist environment.

It is a common practice in the prior art to encapsulate (pot) electrical components such as connectors, relays, circuit assemblies etc., to provide electrical insulation, mechanical support and protection from ambient environments. However, when certain types of potting compositions are exposed to hot, humid environments, they deteriorate and revert to gums or viscous liquids depending on the degree of deterioration. When this occurs in certain electrical applications, such as connectors, the insulation values between the various electrical components such as the wires leading into the connectors, is seriously reduced and the moisture barrier function of the potting composition may be completely lost. Additionally, the liquid or gum may run over other wires or components thereby creating problems in other parts of the electrical system. The most common present day method of rectifying this situation is to depot or desolve out the deteriorated encapsulating material and to repot the unit. It is of course very important to remove entirely the deteriorating encapsulating composition so that no further adverse effects will result from these compositions if they are again exposed to hot humid environments. Copending application Ser. No. 69,958 filed Sept. 4, 1970 entitled "Depotting Solvent" by James V. Duffy and Porter W. Erickson deals with a depotting solvent system for the removal of such deteriorated encapsulating compositions.

Although prior art methods work generally well they suffer from a number of serious disadvantages. For example, some of the solvents used to remove the deteriorated encapsulating material are hazardous to personnel who must work with them. Furthermore, a system of depotting and repotting takes a relatively long time. Similarly, it is usually necessary to use a large number of people to depot and repot such electrical components. Up to now there has been no way in which such deteriorated encapsulating compositions could be restored to a condition wherein it would possess properties similar to the properties of the original compositions before deterioration.

SUMMARY OF THE INVENTION

Accordingly, one object of this invention is to provide a method for rehardening deteriorated encapsulating compositions.

Another object of the present invention is to provide a method for rehardening deteriorated encapsulating compositions which can be performed in situ.

A further object of the instant invention is to provide a method of rehardening deteriorated encapsulating compositions in a relatively short period of time.

Still another object of the present invention is to provide a method for rehardening deteriorated encapsulating compositions in which personnel working with said process would not be exposed to dangerous and hazardous materials.

Still another object of the present invention is to provide a process for rehardening deteriorated encapsulating compositions which is relatively inexpensive.

A still further object of this invention is to provide a method for rehardening deteriorated encapsulating compositions which is relatively rapid.

Another object of this invention is to provide a method which will also harden virgin encapsulating compositions.

These and other objects of this invention are accomplished by providing a process for hardening encapsulating compositions which contain a linkage that is susceptible to hydrolytic cleavage and which are either in the virgin state or which have deteriorated due to exposure to hot humid environments comprising contacting the encapsulating composition with a chemical rehardening agent selected from the group consisting of multifunctional isocyanates, multifunctional epoxides, multifunctional isothiocyanates, carbodiimides and mixtures thereof which additionally may contain a constituent selected from the group consisting of monoisocyanates, monoepoxides, monoisothiocyanates and mixtures thereof.

DESCRIPTION OF THE PREFERRED EMBODIMENTS

Figure 1:
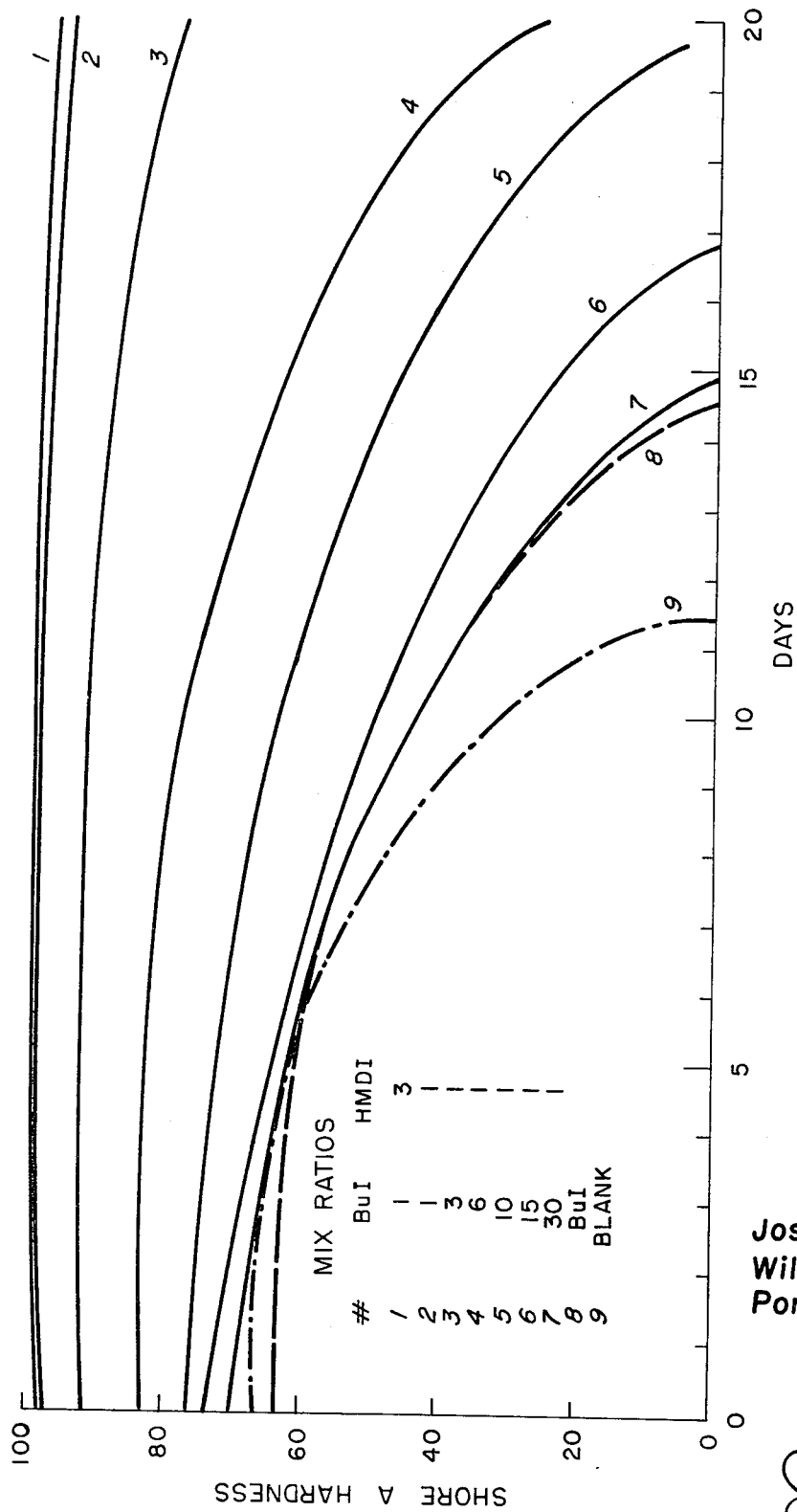
FIGS. 1–2 are graphical views of the Shore A hardness of an encapsulating composition as a function of time.

The chemical hardening agents of this invention are capable of rapidly and efficiently hardening potting compositions which have deteriorated due to exposure to moist and hot environments such as for example, the environment found in tropical regions, or which are still in the virgin state. It is to be understood that within the meaning of this invention the terms "potting composition" and "encapsulating composition" are used as equivalents and apply only to potting or encapsulating compositions which contain linkages that are susceptible to hydrolytic cleavage, such as, for example, polyamides, polyesters and polyester base type polyurethanes.

The process of this invention is carried out by contacting any of the hardening agents with the encapsulating composition, since the nature of the contacting is not in and of itself critical. Thus contacting may be accomplished merely by immersing encapsulating composition in a solution containing the chemical hardening agent. This solution may comprise the hardening agent alone if such agent is a liquid or may comprise the hardening agent mixed with a solvent or, alternatively, may comprise a mixture of hardening agents which may be present with or without a solvent. Some of the more desirable solvents which help the hardening agent rapidly penetrate into the interior of the encapsulating composition include methylene chloride, tetrahydrofuran, toluene, trifluoroethanol, ethylacetate, dimethylacetamide, dioxane, cyclohexanone, xylene, dichlorobenzene and tetrachloroethylene. Contacting may also be effected by injecting the encapsulating composition with the chemical hardening agent by means of a hypodermic syringe or similar apparatus.

The chemical hardening agents of this invention are selected from the group consisting of multifunctional isocyanates, multifunctional epoxides, multifunctional isothiocyanates, carbodiimides and mixtures thereof. Some specific hardening agents which are preferred are 1,6-hexamethylenediisocyanate, 1,4 - tetramethylene-diisocyanate, toluene diisocyanate, trimethyl-1,6-hexamethylenediisocyanate, 1,4-tetramethylenediisothiocyanate, 1,2,7,8-diepoxyoctane, dipentenedioxide, diisopropylcarbodiimide, lycine diisocyanate, isophorone diisocyanate,

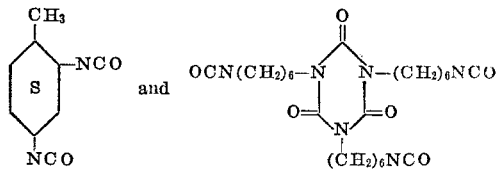

with 1,6-hexamethylene diisocyanate being the most preferred species and difunctional materials being preferred over materials which contain more than two functional groups.

Although uncertain, it is believed that the multifunctional hardening agents of the isocyanate, epoxide and isothiocyanate classes react with some of the loose group in the composition which have been hydrolytically cleaved and form a new polymer network, or with functional groups that are still present even in the virgin material. Thus the compositions which have been subjected to hot, moist environments have many of these groups free to react with the hardening agent and thereby react with them to form a new polymer rather than rebuilding the old polymer which has deteriorated because of hydrolytic cleavage. Besides rehardening the encapsulating composition these rehardening agents yield a product which has a longer lifetime than the original encapsulating composition, i.e., the original composition will deteriorate more rapidly when exposed to a hot, moist environment than will a composition which has been treated with any of the hardening agents whether the composition so treated is virgin material or has already deteriorated due to exposure to a hot, moist environment.

When the carbodiimides are used as hardening agents it appears to reform the broken chains in the original polymer rather than create other linkages and a new polymer. However, it has been shown that even though the carbodiimides are not believed to form a new polymer they do increase the lifetime of the encapsulating composition so that it will last longer than the virgin material. Because of this difference in operation it is not necessary to use multifunctional carbodiimides and it is to be understood that with respect to this invention the term "carbodiimides" is deemed to encompass materials which contain one or many carbodiimide reactive groups.

Furthermore, it has been found that if the encapsulating composition contains free hydroxyl radicals at various points along the polymer chain it is advantageous to treat the composition with monoisocyanates, monoepoxides, monoisothiocyanates or mixtures thereof. Some of the preferred monoisocyanates are butylisocyanate and phenylisocyanate. Although these do not have an appreciable effect on the hardness they do prolong the lifetime of the encapsulating composition. Thus, it is possible to increase the lifetime of the encapsulating composition while avoiding hardness which may be excessive for certain purposes.

The general nature of the invention having been set forth the following examples are presented as specific illustrations thereof. It will be understood that the invention is not limited to these specific examples but is susceptible to various modifications that will be recognized by one of ordinary skill in the art.

EXAMPLE 1

A sample of EC2273 (Minnesota Mining and Manufacturing Co.) which has deteriorated due to exposure to a moist, hot environment and which has a Shore A hardness of about 20 is immersed in 1,6-hexamethylenediisocyanate, which is present as 20% by volume of agent in hexane, for 5 days at which time its hardness increased to approximately 50.

EXAMPLE 2

A sample of Pro Seal 777 which has deteriorated due to exposure to a hot, moist environment and had deteriorated to a sticky syrup was rehardened in 4 days to a Shore A hardness of about 35 when contacted with 1,6-hexamethylenediisocyanate.

EXAMPLE 3

Figure 2:
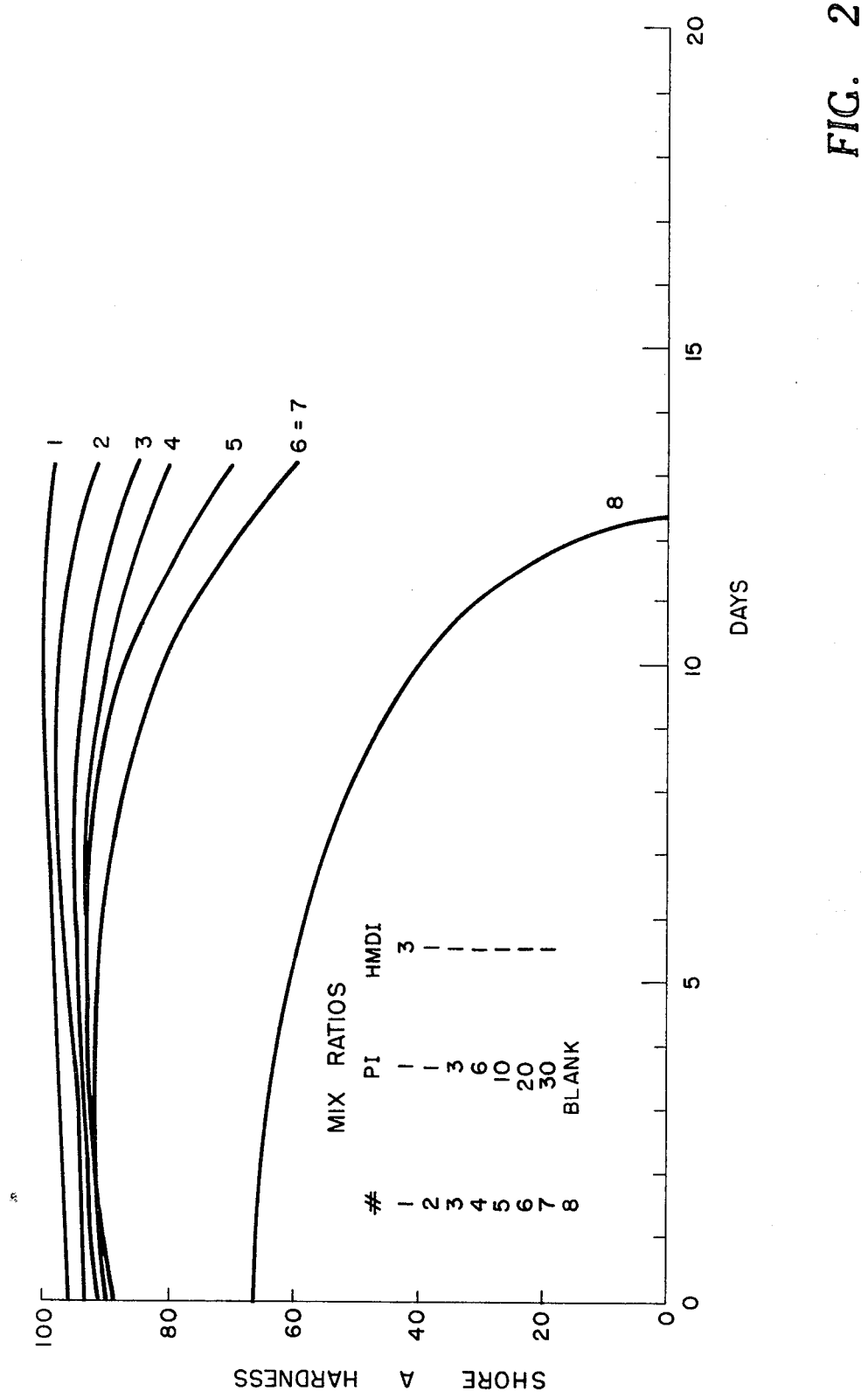

A series of tests were run with the virgin material EC2273 immersed in solutions of either butylisocyanate (BI) or phenylisocyanate (PI) combined with various ratios of 1,6-hexamethylenediisocyanate (HMDI) as a 20% solution in hexane. The hexane in this case was only a diluent and not a penetration solvent and the materials were immersed in the solutions for three days. The Shore A hardness of the samples were measured over a period of days as the encapsulating compositions were kept at 200° F., 95% relative humidity. FIG. 1 is a plot of the variance of the Shore A hardness as a function of time for the various mix ratios of butylisocyanate and 1,6-hexamethylenediisocyanate. In all cases a 20% solution by volume of agent mixture in hexane was applied. FIG. 2 is a similar plot using phenylisocyanate as the monoisocyanate. As can readily be seen from FIGS. 1 and 2 HMDI increases the hardness of the material and prolongs the life relative to the untreated compositions while the monoisocyanate increases the life relative to the untreated material but does not substantially alter the hardness.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method of rehardening an encapsulating composition which contains a linkage that is susceptible to hydrolytic cleavage and which has deteriorated to a viscous liquid due to exposure to a hot, moist environment comprising contacting said deteriorated encapsulating composition with a chemical hardening agent which is comprised of at least a material selected from the group consisting of multifunctional isocyanates, multifunctional epoxides, multifunctional isothiocyanates, carbodiimides and mixtures thereof.

2. The method of claim 1 wherein said hardening agent is selected from the group consisting of 1,6-hexamethylenediisocyanate, 1,4-tetramethylenediisocyanate, toluene diisocyanate, trimethyl - 1,6 - hexamethylenediisocyanate, 1,4-tetramethylenediisothiocyanate, 1,2,7,8-diepoxyoctane, dipentenedioxide, diisopropylcarbodiimide, lycine diisocyanate, isophorone diisocyanate,

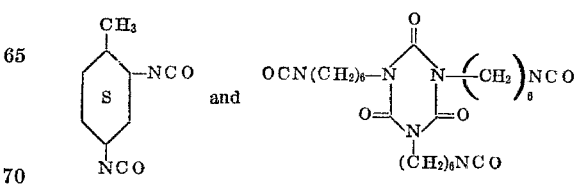

and mixtures thereof.

3. The method of claim 1 wherein said hardening agents are bifunctional.

4. The method of claim 2 wherein said hardening agent is 1,6-hexamethylenediisocyanate.

5. The method of claim 1 wherein said encapsulating composition contains free hydroxyl groups and said hardening agent additionally contains a material selected from the group consisting of monoisocyanates, monoepoxides, monoisothiocyanates and mixtures thereof.

6. The method of claim 5 wherein said additional material is a monoisocyanate.

7. The method of claim 6 wherein said monoisocyanate is selected from the group consisting of butylisocyanate and phenylisocyanate.

8. The method of claim 2 wherein said encapsulating composition contains free hydroxyl groups and said hardening agent additionally contains a material selected from the group consisting of monoisocyanates, monoepoxides, monoisothiocyanates and mixtures thereof.

9. The method of claim 8 wherein said additional material is a monoisocyanate.

10. The method of claim 9 wherein said monoisocyanate is selected from the group consisting of butylisocyanate and phenylisocyanate.

References Cited

UNITED STATES PATENTS

| 2,886,445 | 5/1959 | Rosenthal et al. | 99—135 |
| 3,318,727 | 5/1967 | Boenig et al. | 117—62.2 X |

RICHARD D. LOVERING, Primary Examiner

U.S. Cl. X.R.

117—62.2, 100 A, 100 B, 100 M; 252—316